(12) United States Patent
Wuerfels et al.

(10) Patent No.: US 8,894,331 B2
(45) Date of Patent: Nov. 25, 2014

(54) TOOL FOR MACHINING AND METHOD FOR ORIENTING CUTTING INSERTS IN SUCH A TOOL

(75) Inventors: Andreas Wuerfels, Cologne (DE); Dirk Kammermeier, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 97 days.

(21) Appl. No.: 13/576,443

(22) PCT Filed: Jan. 27, 2011

(86) PCT No.: PCT/US2011/022691
§ 371 (c)(1),
(2), (4) Date: Aug. 1, 2012

(87) PCT Pub. No.: WO2011/102944
PCT Pub. Date: Aug. 25, 2011

(65) Prior Publication Data
US 2012/0321399 A1 Dec. 20, 2012

(30) Foreign Application Priority Data
Feb. 16, 2010 (DE) .......................... 10 2010 008 187

(51) Int. Cl.
*B23B 29/04* (2006.01)
*B23C 5/22* (2006.01)
*B23C 5/24* (2006.01)
*B23B 29/00* (2006.01)

(52) U.S. Cl.
CPC .............. *B23C 5/2295* (2013.01); *B23C 5/241* (2013.01); *B23C 5/2458* (2013.01); *B23C 2245/08* (2013.01); *B23C 2260/84* (2013.01); *B23C 2270/025* (2013.01)

USPC ............................................. 407/91; 407/109

(58) Field of Classification Search
CPC   B23B 2205/02; B23B 2205/00; B23B 29/04; B23B 29/12; B23B 29/00
USPC .............. 407/35, 41, 49, 50, 109, 110, 91, 66
See application file for complete search history.

(56) References Cited

U.S. PATENT DOCUMENTS 4,658,875 A * 4/1987 Grabovac ...................... 144/230
5,163,490 A * 11/1992 Meis .............................. 144/230

(Continued)

FOREIGN PATENT DOCUMENTS

CN           1289283 A    3/2001
JP           11-058108 A  3/1999

(Continued)

*Primary Examiner* — Will Fridie, Jr.
(74) *Attorney, Agent, or Firm* — Larry R. Meenan, Esq.

(57) ABSTRACT

A tool includes a parent body (12) and at least two cutting inserts (14) fastened directly or indirectly to the parent body (12). A central clamping device (30) is configured to clamp the cutting inserts (14) in an oriented position relative to the parent body (12). An assembly includes the tool (10) and a jig (32), which can accommodate the tool (10) in such a way that the cutting insert (14) is located in a desired position on the tool (10) and can be clamped in the desired position by actuating the clamping device (30). A method for fastening at least one cutting insert (14) to the parent body (12) includes fitting the parent body (12) with the cutting insert (14); arranging the parent body (12) in a jig (32); bringing the cutting insert (14) into a desired position; and clamping the cutting insert (14) in the desired position.

18 Claims, 5 Drawing Sheets

(56) References Cited

U.S. PATENT DOCUMENTS 6,299,389 B1 * 10/2001 Barazani ................. 407/110
6,902,357 B2 * 6/2005 Blessing et al. ............. 408/204

FOREIGN PATENT DOCUMENTS

| JP | 2003-211306 A | 7/2003 |
| WO | 2006011562 A1 | 2/2006 |

* cited by examiner

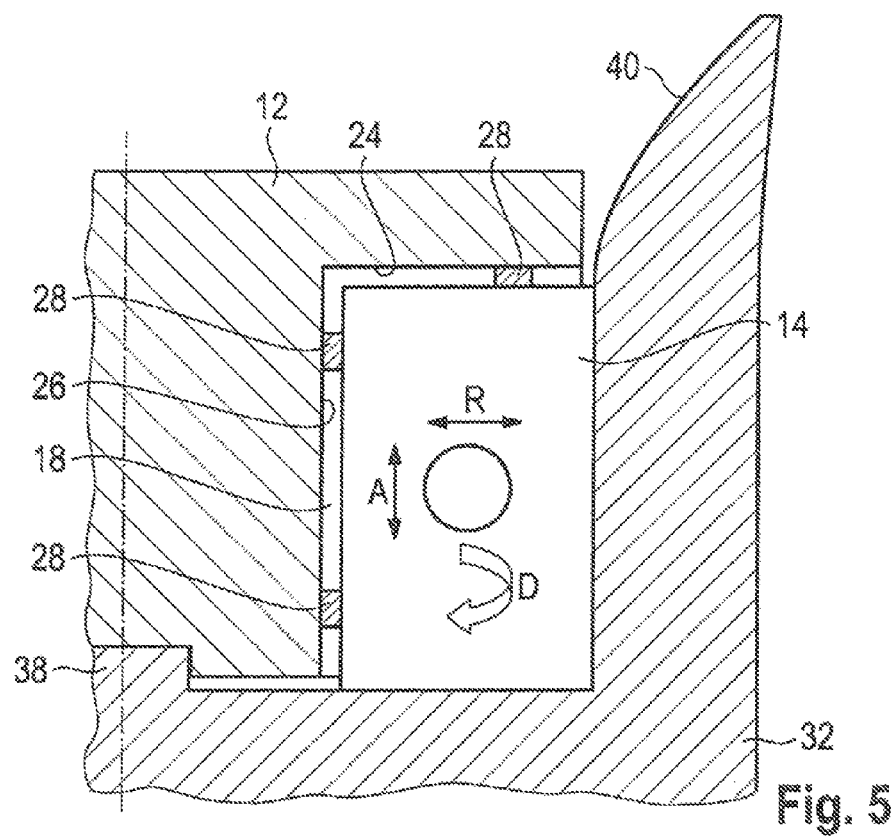
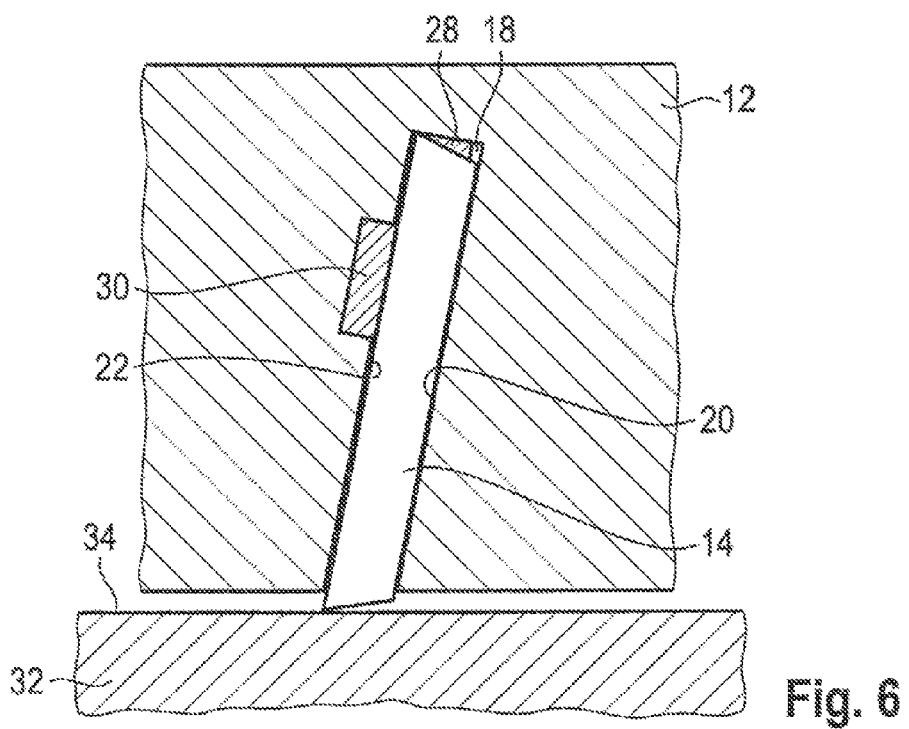

TOOL FOR MACHINING AND METHOD FOR ORIENTING CUTTING INSERTS IN SUCH A TOOL

CLAIM TO PRIORITY

This application is a National Phase of International Application PCT/ US2011/0022691, filed on Jan. 27, 2011, which claims priority to German Application No. 10 2010 008 187.6, filed on Feb. 16, 2010, the entire contents of all these applications are incorporated herein by reference.

FIELD OF THE INVENTION

The invention relates to a tool for machining, comprising a parent body and at least two cutting inserts which are fastened directly or indirectly to the parent body. The invention also relates to an assembly comprising such a tool and a jig which serves to orient the cutting inserts on the parent body. Finally, the invention relates to a method for fastening cutting inserts to a parent body of such a tool.

BACKGROUND OF THE INVENTION

The tool according to the invention is a milling cutter, drill or reaming tool in the widest sense, that is to say a tool which is set in rotation and is used for stock removal by machining. To machine the material to be cut, a plurality of cutting inserts are provided on the parent body of the tool. Said cutting inserts are usually made of sintered materials or of cutting materials produced by a metallurgical melting process and have at least one cutting edge. In order to ensure a long service life of the cutting inserts used and a high quality of the machined surface of the workpiece, it is important that the cutting edges of all the cutting inserts of a tool are correctly oriented. If the cutting edges acting on the workpiece are not exactly oriented axially and/or radially, a uniform surface is not obtained. If some of the cutting inserts project further in the direction of the surface of the workpiece than other cutting inserts, the cutting edges which project further are prematurely worn.

It is known from the prior art to attach each cutting insert to the parent body in an individually adjustable manner. This enables the user of the tool to correctly orient the cutting inserts individually. From the multiplicity of known designs, US 2007/0127992 A1 and US 2008 0107493 A1 may be mentioned as examples. Shown in the first-mentioned document is a milling cutter in which each cutting insert is attached to a holder, which is arranged in turn in a receptacle of the parent body of the milling cutter. An adjusting screw is provided behind the rear side, facing away from the cutting insert, of each holder, by means of which adjusting screw the position of each holder can be set individually in the axial direction. The second document mentioned discloses an adjusting device which can be used in drilling tools, milling cutters and lathe tools. Here, too, a holder to which the corresponding cutting insert is attached is used. The holder is fastened to the tool at its end remote from the cutting insert and is provided with a bending region, such that the end provided with the cutting insert can be adjusted outward in the radial direction. Provided for the adjustment is an adjusting screw which is provided with an eccentric surface and which can displace an adjusting slide provided with a wedge surface, a pressure piece bearing in turn against the wedge surface of the adjusting slide, this pressure piece interacting with the holder. A common feature of these solutions and the other known solutions from the prior art is that each individual cutting insert has to be adjusted manually. The effort involved here is also quite considerable when two cutting inserts are attached to a holder; in this case, too, complicated manual adjustment must be carried out.

As an alternative to the manual adjustment of each individual cutting insert, it is known to use cutting inserts which are produced with high precision and which are arranged in receptacles which are likewise produced with corresponding precision. In this way, the manual adjustment of each individual cutting insert can be avoided. However, the close tolerances which have to be maintained during both the production of the cutting inserts and the production of the tool require a very high production outlay, which leads to high production costs.

SUMMARY OF THE INVENTION

The object of the invention is to provide a tool and a method for fitting a tool with cutting inserts which is distinguished by low production costs for the tool and the cutting inserts and in addition permits precise adjustment of all the cutting inserts with little effort.

To achieve this object, a central clamping device is provided according to the invention in a tool of the type mentioned at the beginning, by means of which central clamping device the cutting inserts can be secured or clamped in an oriented position relative to the parent body. The tool according to the invention is based on the basic idea of first orienting all the cutting inserts relative to the parent body and of then clamping a plurality of cutting inserts simultaneously in their desired position in one operation. This enables cutting inserts having standard production tolerances to be used and also enables simply the normal tolerances to be maintained during the production of the parent body. This results in low production costs. The requisite precision of the tool is obtained by each individual cutting insert being located individually in its desired position. Through the use of the central clamping device, however, the effort involved in having to clamp each individual cutting insert in its position is not required.

A plurality of receptacles, in which a respective cutting insert is arranged, are preferably provided on the parent body. The use of individual receptacles for each cutting insert results in high strength of the tool with high precision.

Depending on the requirements, each cutting insert can either be inserted directly into the receptacle or alternatively can be attached to a holder, which is then inserted in turn in the corresponding receptacle. If the cutting insert is to be inserted directly into the receptacle, a certain minimum size is required so that the cutting insert can be reliably clamped. This leads to somewhat greater use of material during the production of the cutting insert. Instead, however, the effort required to attach the cutting insert to a holder is not required. On the other hand, if a holder is used, the actual cutting insert can be made very much smaller. This saves material during the production of the cutting insert, but requires attachment to the holder.

The cutting insert is preferably displaceable and rotatable in the receptacle in the axial and/or radial direction when the clamping device is not actuated. This enables all the cutting inserts (if need be with their holders) to be correctly oriented on the parent body and clamped in the desired position after the orientation.

According to a preferred embodiment, the receptacle is designed like a pocket having a base surface, a top surface and at least one side surface. Such a receptacle encloses the cutting insert (and if need be the holder used) very tightly, such that good guidance of the cutting insert in the parent body is ensured.

In order to ensure precise orientation of the cutting inserts, the clamping device clamps the cutting insert against a reference surface or a plurality of reference surfaces. This reference surface can be, in particular, the base surface or the top surface of the receptacle. It is also possible for the reference surfaces to be formed by one or more side surfaces and a base surface or top surface of the receptacle. This configuration is suitable if only axial orientation of the cutting inserts is necessary, as is the case in face milling.

Pressure means which attempt to push the cutting insert out of the receptacle are preferably provided. The pressure means ensure that each cutting insert, in the initial state, is located in a position "outside" the desired position. This is the precondition required for all the cutting inserts to be pushed simultaneously into their desired position by very simple means, for example a jig, into which the parent body is inserted. The cutting inserts can then be clamped in the desired position by actuating the clamping device.

The pressure means can be formed, for example, by at least one spring, for example a leaf spring, or also by a plurality of elastomer elements, in particular rubber elements.

The clamping device can be a mechanical clamping device. In this case, the clamping device can have in particular a clamping element which can be adjusted axially with a thread. This enables the requisite clamping forces to be applied by tightening the clamping element. Alternatively or additionally, it is possible for the clamping device to have a clamping wedge. This also enables the requisite clamping forces to be easily produced.

Alternatively, the clamping device can be a hydraulic clamping device. In this case, the clamping device in particular has an expansion chamber. Such a configuration is known in principle from expansion chucks.

The aforesaid object is also achieved by an assembly comprising a tool and a jig which can accommodate the tool in such a way that the at least one cutting insert is located in a desired position on the tool and can be clamped in the desired position by actuating the clamping device. The task of the jig is to bring the cutting inserts from their initial position, in which they are originally located "temporarily" on the parent body, into the desired position. If pressure means are used in the parent body, the task of the jig is in particular to press the cutting inserts simultaneously into their desired position in the axial and/or radial direction. In this position, they can then be clamped on the parent body by actuating the clamping device.

If no pressure means are provided on the tool, the task of the jig is also to pull the cutting inserts into their desired position in the axial and/or radial direction. Holding means, for example magnets or holding arms, can be provided for this purpose.

The aforesaid object is also achieved by a method for fastening cutting inserts to a parent body of a tool for machining, in which method first of all the parent body is fitted with the cutting inserts. The parent body is then arranged in a jig, the jig bringing the cutting inserts into their desired position. Finally, each cutting insert is clamped in its desired position on the parent body. In this method, the precise orientation of all the cutting inserts is carried out in a single step, namely by the simple arrangement of the parent body in a jig, said parent body being fitted with the cutting inserts. It is not necessary to orient each cutting insert individually.

In this case, it is in principle possible to clamp each cutting insert using an individual clamping device. However, a clamping device which clamps more than one cutting insert is preferably used in order to make it easier to fasten the cutting inserts. In particular, a central clamping device is used, with which all the cutting inserts can be clamped simultaneously. In this way, minimum effort is required for fastening the cutting inserts.

BRIEF DESCRIPTION OF THE DRAWINGS

The invention is described below with reference to various embodiments which are shown in the attached drawings, in which:

FIG. 5 shows a view corresponding to FIG. 2, a second embodiment being shown;

FIG. 6 shows the second embodiment in a view corresponding to FIG. 3;

DETAILED DESCRIPTION OF THE EMBODIMENTS

Figure 1:
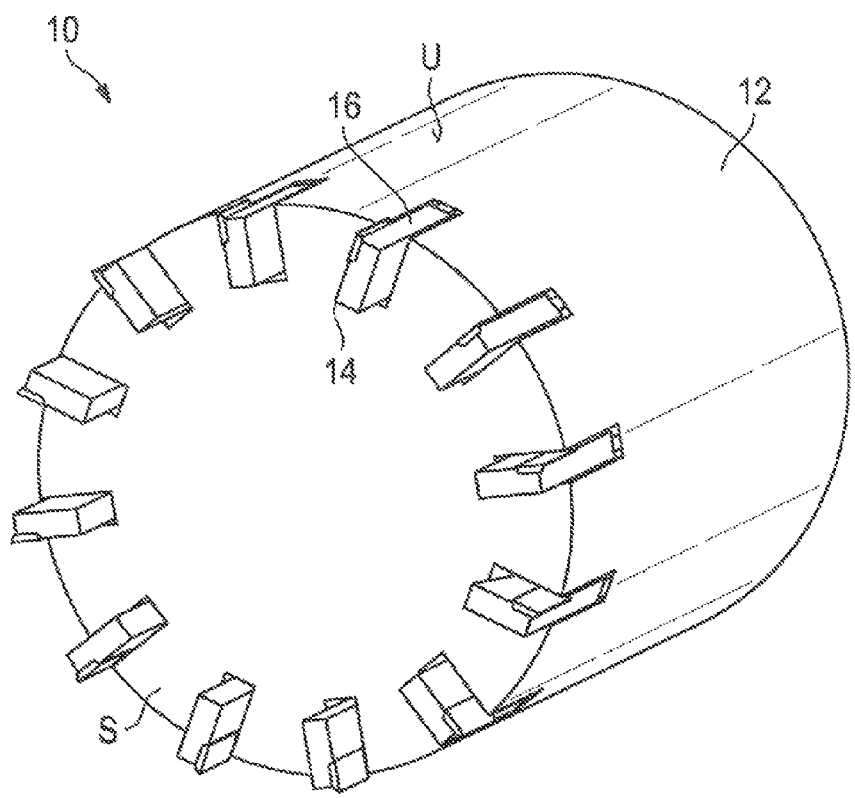
FIG. 1 shows a tool according to the invention in a schematic, perspective view.

A tool 10 for machining which has a parent body 12 is shown schematically in FIG. 1. Attached to the parent body are a plurality of cutting inserts 14 which, in the exemplary embodiment shown here, project both in the radial direction beyond the circumferential surface U and in the axial direction beyond an end face S of the parent body 12. In the exemplary embodiment shown here, the tool 10 is a milling cutter. The way in which the cutting inserts 14 are attached to the parent body 12 can be applied in principle to any other tool for machining in which a plurality of cutting inserts are to be attached in a certain position, for example drilling tools.

Here, each cutting insert 14 is attached to a holder 16 (see also FIGS. 2 and 3) which is arranged in each case in a pocket-like receptacle 18 of the parent body 12. Each receptacle 18 is formed by a base surface 20, a top surface 22 opposite the base surface 20, and two side surfaces 24, 26, which connect the base surface 20 to the top surface 22.

The dimensions of the receptacle 18 are such that the holder 16 together with the cutting insert 14 can be inserted with clearance into the corresponding receptacle 18. For this reason, each holder 16 is displaceable in the receptacle 18 in both the axial direction A and the radial direction R. In addition, the holder 16 and thus the cutting insert 14 can be rotated about an axis which is perpendicular to the base surface 20 (see arrow D in FIG. 2). Three pressure means 28, which are designed here as rubber elements, are arranged between the side surfaces 24, 26 of the receptacle 18 and the edges of the holder 16 that are opposite said side surfaces. Said pressure means 28 displace the holder 16 and thus the cutting insert 14 both in axial direction A and in radial direction R outward from the receptacle 18.

A clamping device 30 which can displace the holder 16 against the base surface 20 is arranged on that side of the receptacle 18 which is opposite the base surface 20. When the clamping device 30 is activated, the holder 16 is firmly restrained against the base surface 20, which then acts as a reference surface for the orientation of the cutting insert.

According to a development (not shown), provision can be made for the cutting inserts and/or the receptacles for the cutting inserts to be geometrically shaped in such a way that they cannot leave the tool receptacle radially if the clamping force of the clamping device decreases undesirably during operation.

Figure 2:
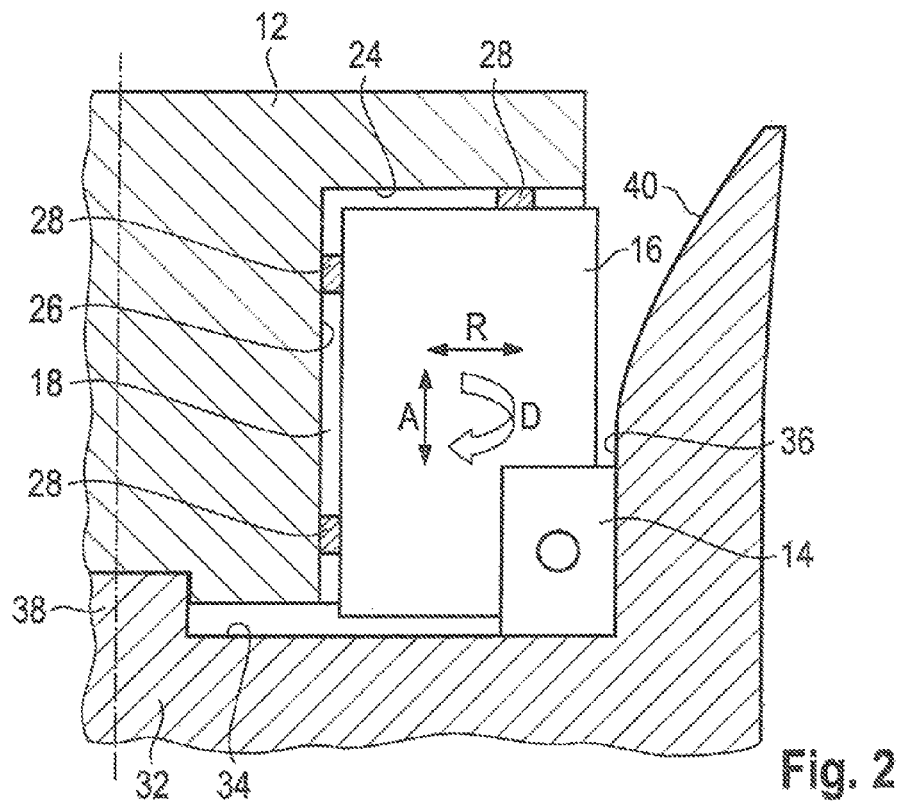
FIG. 2 shows, in a schematic sectional view, a receptacle in the tool with cutting insert arranged therein according to a first embodiment, the tool being arranged in a jig.

A jig 32 in which the parent body 12 can be arranged is used for orienting and adjusting the cutting inserts 14 in the parent body 12. The jig 32 is provided with centering structures 38 which are indicated in FIG. 2 and which ensure that the parent body 12 comes to lie both in a centered manner in the radial direction and at the correct height in the axial direction in the jig 32. To position the cutting inserts, the jig 32 has an axial bearing surface 34 and a radial bearing surface 36.

The jig is made of a material which virtually rules out damage to the cutting edges of the cutting inserts, but at the same time ensures the precise positioning. Suitable materials are aluminum, plastics with high rigidity, and hardwood.

It will now be explained with reference to FIG. 4 how the jig 32 brings the cutting inserts 14 into their desired position. The pressure means 28 ensure that, in the initial position, the cutting insert 14 together with the holder 16 project outward beyond the desired position in the radial direction and in the axial direction. In this initial position, the cutting insert 14, when the parent body is pushed into the jig 32, first of all runs against a sloping insertion surface 40. When pushed in further, the cutting insert 14 is pushed radially inward by the insertion surface 40 until said cutting insert 14 reaches the radial bearing surface 36. When the parent body 12 is put onto the centering structure 38, the cutting insert 14 also comes into contact with an axial bearing surface 34. Both bearing surfaces 34, 36 cause the cutting insert 14 together with its holder 16 to be displaced into the receptacle 18 in the radial direction and axial direction against the action of the pressure means 28. In the process, the pressure means 28, which are shown as leaf springs in FIG. 4 as an alternative configuration, ensure that the cutting edges of the cutting insert 14 bear in their correct orientation against the axial bearing surface 34 and the radial bearing surface 36. The pressure means 28 are adapted with regard to their pressure force and their direction of action in such a way that undesirable tilting of the cutting insert 14 about one of its corners is prevented. Therefore, the cutting insert 14, as can be seen in FIG. 2, bears with its two cutting edges against the axial bearing surface 34 and the radial bearing surface 36. This position corresponds to the desired position of the cutting insert 14 relative to the parent body 12.

Figure 3:
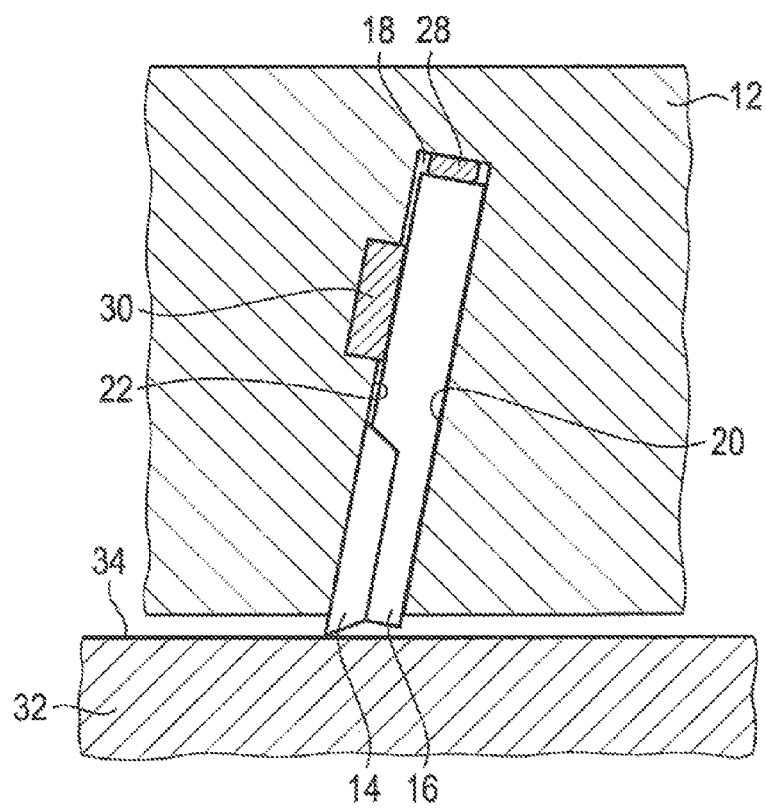
FIG. 3 shows a sectional view perpendicular to the sectional view of FIG. 2.
Figure 4:
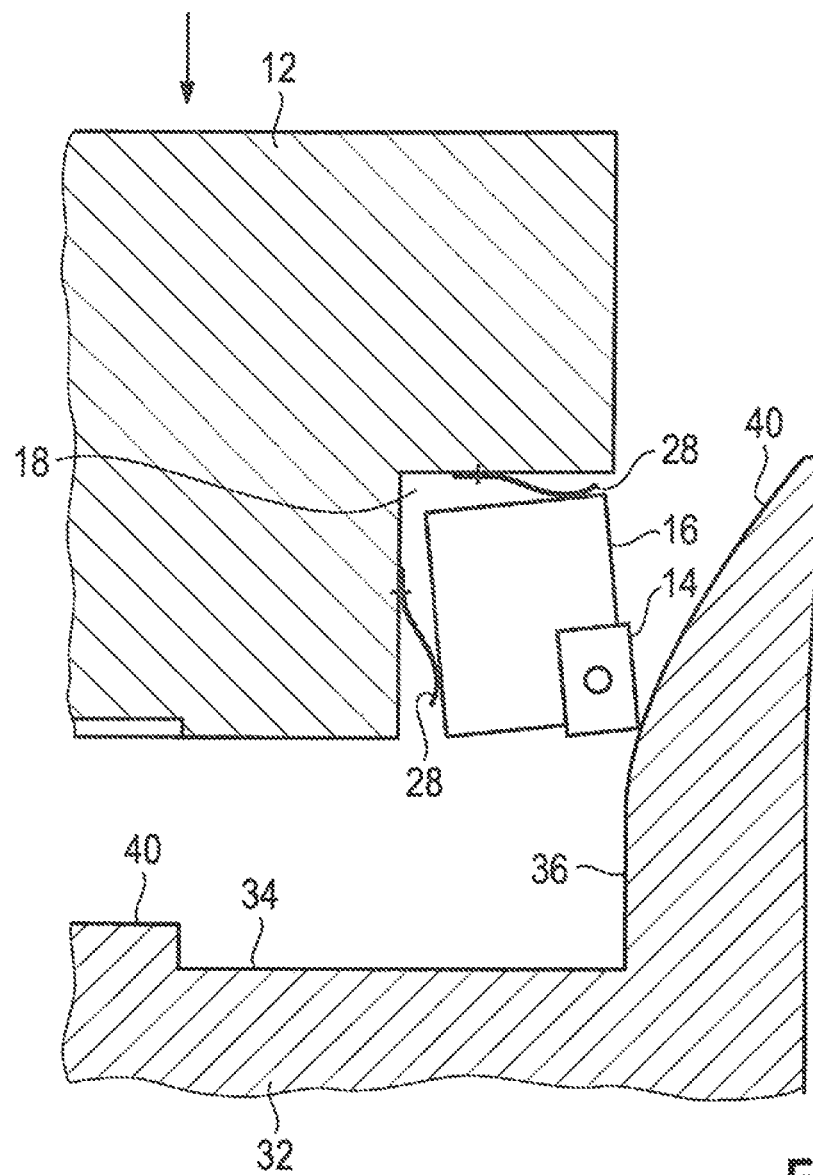
FIG. 4 schematically shows the tool in FIGS. 1 to 3 when being inserted into the jig.

When the parent body 12 is inserted together with the cutting inserts arranged in the receptacles, not only is the cutting insert 14 shown by way of example in FIGS. 2 to 4 brought into its desired position, but rather all the cutting inserts are brought into their desired position simultaneously. As soon as the parent body 12 of the tool is located in the jig 32 and all the cutting inserts are thereby brought into their desired position automatically, the clamping device 30 is actuated, such that all the cutting inserts 14 are simultaneously clamped (indirectly via their holders 16) in the corresponding receptacle 18. The tool is then ready for use.

As an alternative to the described jig having sloping insertion surfaces, a jig which consists of a plurality of parts and which can be pushed together from an open position into a closed position can also be used. In such an embodiment, (virtually) no displacement of the cutting edges of the cutting inserts on the surface of the jig occurs, which prevents both chipping of the cutting edges and wear of the jig.

It can be seen that the jig can be reused. Thus, every new tool which is to be fitted with cutting inserts can be adjusted in the corresponding, matching jig, and a tool with cutting inserts already fitted can be readjusted with the matching jig by the tool being inserted into the jig, by the clamping device 30 being released, such that the pressure means 28 can press the cutting inserts against the bearing surfaces 34, 36 again, and then by the clamping device being reactivated.

It is also possible to use a standardized parent body, into which various receptacles or cutting inserts are inserted, which are then oriented by means of different jigs.

An alternative configuration is shown in FIGS. 5 and 6. The same designations are used for the components known from the first embodiment and reference is made in this respect to the above explanations.

The essential difference between the first embodiment and the second embodiment consists in the fact that, in the second embodiment, the cutting insert 14 is attached directly in the corresponding receptacle 18. No holder is used, and so the cutting insert 14 is pressed by the clamping device 30 directly against the base surface 20 acting as reference surface.

Figure 7:
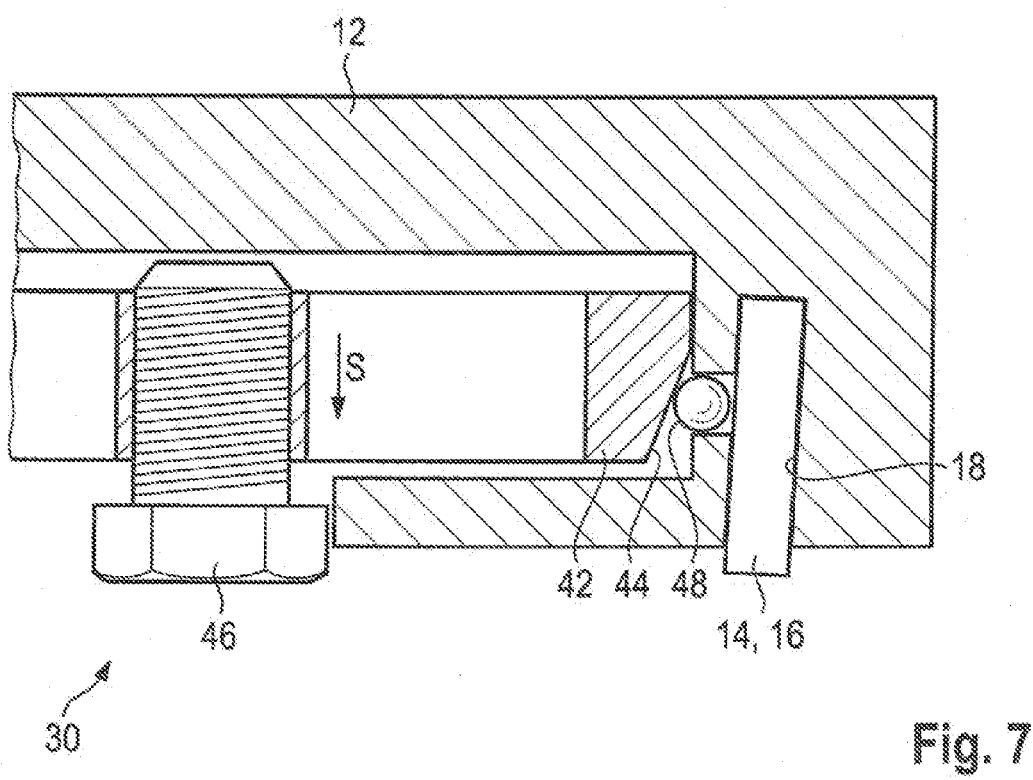
FIG. 7 shows a tool having a mechanical clamping device in a schematic sectional view.

Shown schematically in FIG. 7 is a mechanical clamping device 30 which has a clamping ring 42 having a wedge surface 44 and a clamping screw 46. Bearing against the wedge surface 44 is a clamping ball 48 which is guided in the parent body 12. The clamping ring 42 is adjusted in the parent body 12 in a clamping direction S by tightening the clamping screw 46, such that the clamping ball 48 is displaced radially outward. The clamping ball 48 presses directly against the holder 16 or the cutting insert 14, such that said holder 16 or cutting insert 14 is clamped against the base surface of the corresponding receptacle 18.

Figure 8:
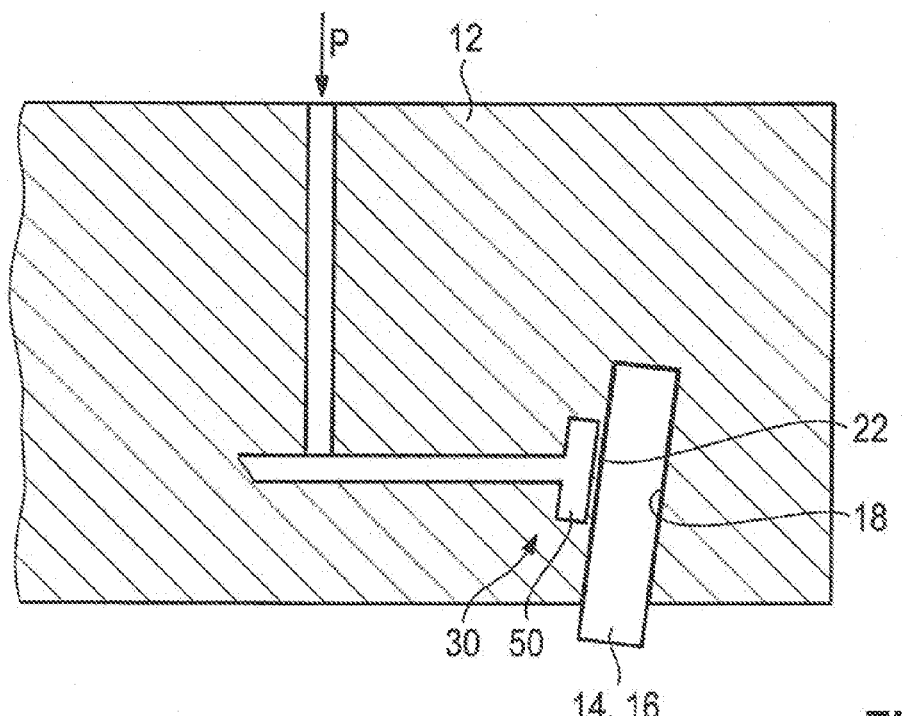
FIG. 8 shows a tool having a hydraulic clamping device in a schematic view.

A tool having a hydraulic clamping device 30 is shown in FIG. 8. The clamping device 30 uses an expansion chamber 50 which is arranged "behind" the top surface 22 of the corresponding receptacle. The top surface 22 is deformed toward the base surface 20 by applying a hydraulic pressure P to the expansion chamber 50, such that the holder 16 or the cutting insert 14 is clamped between the base surface 20 and the top surface 22. The pressure supply for the expansion chamber 50 and the way in which the hydraulic pressure is generated and controlled is already known in principle from expansion chucks and is not explained in any more detail here.

Instead of the pressure means 28 which press the holder 16 or the cutting insert 14 out of the receptacle 18, other means which ensure that the cutting edges of the cutting insert 14 bear in linear contact against the bearing surfaces 34, 36 can also be used. For example, magnetic repelling forces could be used between parent body and cutting insert 14 or holder 16, or magnetic attraction forces could be used between the jig 32 and the cutting insert 14 or the holder 16. Depending on the respective spatial orientation, it could also be sufficient to use solely the force of gravity in the axial direction in order to ensure that the cutting inserts bear against the axial bearing surface 34. It is also conceivable in principle to provide mechanical means in the jig 32, for example holding arms.

In deviation from the embodiment shown, the receptacle 18 can also have a shape different from a rectangular shape. The side surfaces need not be rectilinear, but rather can run in a curved manner. Nor do two side surfaces need to be used, but rather a single side surface can also be used.

What is claimed is:

1. A tool for machining, comprising:
a parent body with a plurality of receptacles;

a plurality of cutting inserts fastened directly or indirectly to the parent body, each cutting insert arranged in a corresponding receptacle;

a pressure means for biasing each cutting insert outwardly from the corresponding receptacle in both an axial direction and a radial direction such that a jig is capable of simultaneously positioning each cutting insert in a desired axial position and a desired radial position relative to the parent body; and a central clamping device for clamping the plurality of cutting inserts in the desired axial position and the desired radial position relative to the parent body.

2. A method for fastening cutting inserts to a parent body of a tool for machining, comprising the following steps:

fitting the parent body with a plurality of cutting inserts;

biasing each cutting insert outwardly from the corresponding receptacle in both an axial direction and a radial direction;

arranging the parent body in a jig such that the jig simultaneously positions each cutting insert in a desired axial position and a desired radial position relative to the parent body; and clamping the cutting insert in the desired axial position and the desired radial position on the parent body.

3. The tool as claimed in claim 1, wherein the cutting insert is attached to a holder, which in turn is arranged in the corresponding receptacle.

4. The tool as claimed in claim 1, wherein the receptacle is a pocket having a base surface, a top surface and at least one side surface.

5. The tool as claimed in claim 4, wherein the cutting insert, when the clamping device is not actuated, can be rotated about an axis which is perpendicular to the base surface of the corresponding receptacle.

6. The tool as claimed in claim 1, wherein the clamping device clamps the cutting insert against a reference surface.

7. The tool as claimed in claim 6, wherein the reference surface is the base surface, the top surface and/or a side surface of the corresponding receptacle.

8. The tool as claimed in claim 1, wherein the jig is provided with an axial bearing surface for positioning each cutting insert in the desired axial position and a radial bearing surface for positioning each cutting insert in the desired radial position.

9. The tool as claimed in claim 1, wherein the pressure means comprises at least one spring.

10. The tool as claimed in claim 1, wherein the pressure means comprises a plurality of elastomer elements.

11. The tool as claimed in claim 1, wherein the pressure means comprises leaf springs.

12. The tool as claimed in claim 1, wherein the clamping device is a mechanical clamping device.

13. The tool as claimed in claim 12, wherein the clamping device has a clamping element which can be adjusted axially with a thread.

14. The tool as claimed in claim 12, wherein the clamping device has a clamping wedge.

15. The tool as claimed in claim 1, wherein the clamping device is a hydraulic clamping device.

16. The tool as claimed in claim 15, wherein the clamping device has an expansion chamber.

17. The tool as claimed in claim 1, wherein the jig is provided with centering structures for properly positioning the parent body in both in a radial direction and an axial direction relative to the jig.

18. The tool as claimed in claim 8, wherein the jig is provided with an insertion surface for engaging each cutting insert when simultaneously positioning each cutting insert until each cutting insert subsequently engages the radial bearing surface.

* * * * *